W. QUARITIUS.
LUMINOUS LURE FOR ANIMAL TRAPS.
APPLICATION FILED APR. 26, 1921.

1,399,518.

Patented Dec. 6, 1921.

INVENTOR
William Quaritius
By W. W. Williamson Atty.

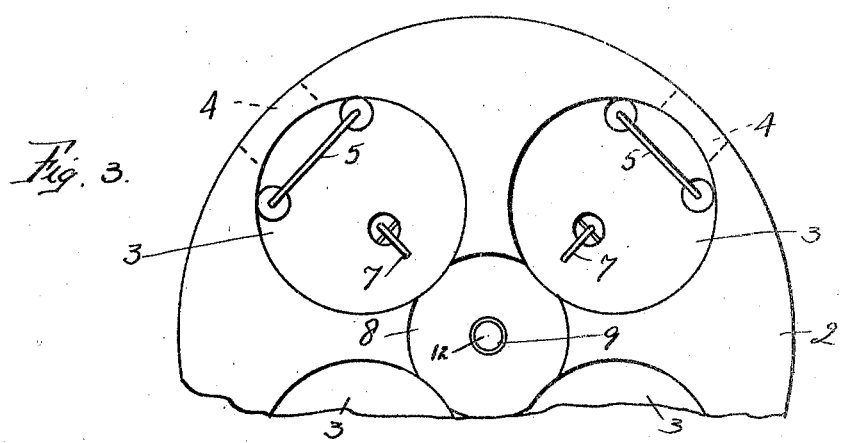
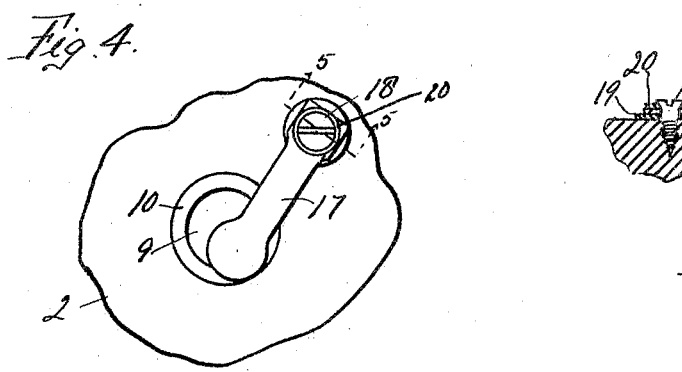
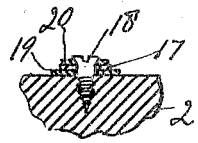
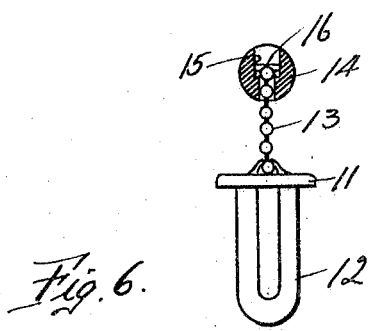
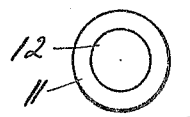

UNITED STATES PATENT OFFICE.

WILLIAM QUARITIUS, OF VICKSBURG, MISSISSIPPI.

LUMINOUS LURE FOR ANIMAL-TRAPS.

1,399,518.

Specification of Letters Patent.

Patented Dec. 6, 1921.

Application filed April 26, 1921. Serial No. 464,643.

*To all whom it may concern:*

Be it known that I, WILLIAM QUARITIUS, a citizen of the United States, residing at Vicksburg, in the county of Warren and State of Mississippi, have invented new and useful Improvements in a Luminous Lure for Animal-Traps, of which the following is a specification.

My invention relates to a luminous lure for animal traps, and has for its object to provide an exceedingly simple and effective device of this character which will be relatively inexpensive in the cost of manufacture and when applied to a trap will emit luminous rays of sufficient intensity to attract animals in the locality of the trap.

Another object of the invention is to so construct a trap that the animal chamber or chambers will be in communication with an illumination chamber into which projects a portion of the luminous lure situated in a recess formed in the trap and to provide means for preventing the accidental withdrawal of the luminous lure.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 3, is a fragmentary bottom plan view of the same.

Fig. 4, is an enlarged fragmentary plan view of the trap in the region of the recess containing the luminous lure illustrating the retaining clip.

Fig. 5, is a section at the line 5—5 of Fig. 4.

Fig. 6, is an enlarged side elevation of the luminous lure with its captive ball, the latter being shown in section.

Fig. 7, is an end view of the luminous lure.

Figure 1:
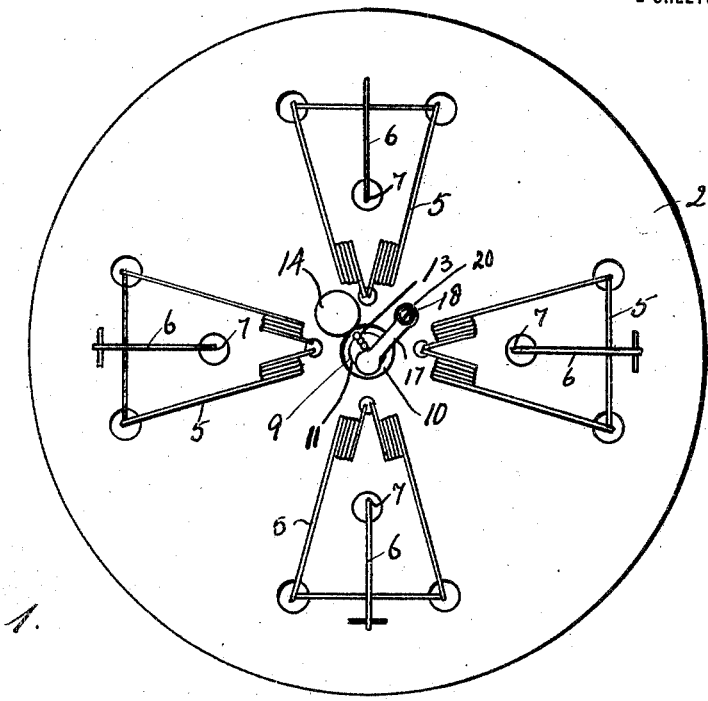
Figure 1, is a plan view of a trap embodying my invention.
Figure 2:
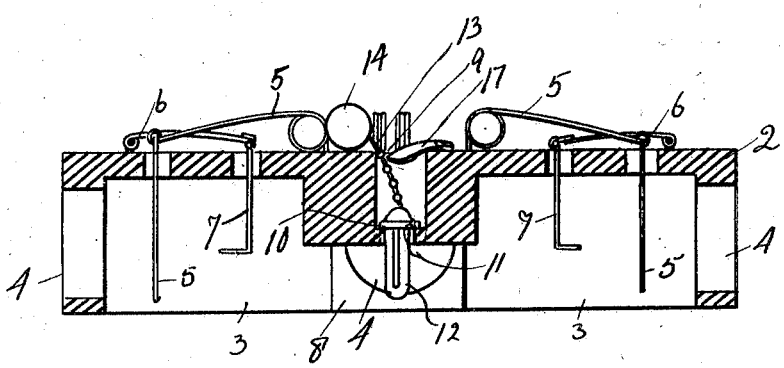
Fig. 2, is a sectional view thereof.

In carrying out my invention as here embodied, 2 represents an animal trap of any desirable or well known construction, here shown as the conventional mouse trap, which is provided with animal chambers or compartments 3 having entrance passageways 4 leading thereto.

The trap is further provided with any suitable snares 5 or other captive retaining means portions of which are within the animal chambers and said snares are held in set positions by means of the reaches 6 and triggers 7, the latter adapted to hold the ordinary lure or bait.

Communicating with the animal chambers 3 is an illumination chamber 8 while through the body of the trap is formed a recess or bore 9 of two different diameters, the portion of smallest diameter being at the lower end to provide a shoulder 10 on which rests the flange 11 of the luminous lure 12. This luminous lure is in the form of a glass or transparent container for holding radium powder or other suitable luminous substance and has one end of a chain 13 attached thereto, the other end of said chain carrying a captive ball 14. This ball has a bore 15 of two different diameters in which the chain is inserted, the latter having a collar 16 thereon to prevent withdrawal of the ball from said chain. When the luminous lure is in the recess 9 the captive ball rests on the outside of the trap and by taking hold of said ball the luminous lure may be readily withdrawn from the recess.

In order to prevent the accidental displacement of the luminous lure from the recess I provide a retaining clip 17 pivoted to the trap by means of a screw 18 the free end of said clip adapted to normally overlie the upper end of the recess 9 and said clip is preferably slightly curved longitudinally so that the free end thereof will project into the recess and cannot be moved about its pivot point without first being slightly raised. This clip is mounted between two washers 19 and 20 placed on the screw 18.

Numerous animals and particularly mice and rats are attracted by luminous substances and small rays of light and since a device of the character herein mentioned throws off a relatively small amount of illumination I have found that the use thereof will lure such animals to the entrance or entrances of the trap and if not actually causing them to enter the trap will entice them sufficiently close to bring them within the radius of the odor emanating from the other ordinary lure or bait.

Of course I do not wish to be limited to the exact details of construction as herein shown as these may be varied within the limits of the appended claim without departing from the spirit of my invention.

Having thus fully described my invention, what I claim as new and useful is:—

A trap having an animal chamber, an illumination chamber in communication therewith and a recess communicating with the last mentioned chamber, a lure including a self-illuminating powder located in said recess, a chain connected with said lure, a captive ball fastened to said chain, and a retaining clip pivoted to the trap for preventing accidental withdrawal of the lure, said clip being curved longitudinally whereby its free end will project into the recess when in registration with said recess.

In testimony whereof, I have hereunto affixed my signature.

WM. QUARITIUS.